United States Patent
Hassel et al.

(10) Patent No.: US 12,492,442 B2
(45) Date of Patent: Dec. 9, 2025

(54) METHOD FOR THE OPEN-LOOP OR CLOSED-LOOP CONTROL OF THE TEMPERATURE OF A STEEL STRIP DURING HOT WORKING IN A HOT STRIP MILL

(71) Applicant: SMS group GmbH, Düsseldorf (DE)

(72) Inventors: Christoph Hassel, Duisburg (DE); August Sprock, Düsseldorf (DE); Kai Grybel, Siegen (DE); Guido Buschhoff, Hilchenbach (DE)

(73) Assignee: SMS group GmbH, Düsseldorf (DE)

( * ) Notice: Subject to any disclaimer, the term of this patent is extended or adjusted under 35 U.S.C. 154(b) by 463 days.

(21) Appl. No.: 17/923,393

(22) PCT Filed: Mar. 25, 2021

(86) PCT No.: PCT/EP2021/057720
§ 371 (c)(1),
(2) Date: Nov. 7, 2022

(87) PCT Pub. No.: WO2021/223937
PCT Pub. Date: Nov. 11, 2021

(65) Prior Publication Data
US 2023/0203612 A1    Jun. 29, 2023

(30) Foreign Application Priority Data
May 5, 2020  (DE) .................... 10 2020 205 655.2

(51) Int. Cl.
C21D 8/04   (2006.01)
B21B 37/74  (2006.01)
C21D 9/52   (2006.01)

(52) U.S. Cl.
CPC ............ *C21D 8/0426* (2013.01); *B21B 37/74* (2013.01); *C21D 9/52* (2013.01); *B21B 2261/20* (2013.01)

(58) Field of Classification Search
CPC . B21B 37/74; B21B 2261/20; B21B 2275/06; G05B 13/042; G05B 19/41875;
(Continued)

(56) References Cited

U.S. PATENT DOCUMENTS

| 6,207,936 B1* | 3/2001 | de Waard | G05B 13/048 |
| | | | 219/486 |
| 2010/0131092 A1* | 5/2010 | Schmors | B21B 37/76 |
| | | | 700/103 |

FOREIGN PATENT DOCUMENTS

| DE | 112013001434 T5 | 12/2014 |
| DE | 102019210056 A1 | 1/2020 |

(Continued)

OTHER PUBLICATIONS

Examination Report issued on Jan. 6, 2023, in corresponding Indian Application No. 202247069612, 6 pages.
(Continued)

*Primary Examiner* — Darrin D Dunn
(74) *Attorney, Agent, or Firm* — Maier & Maier, PLLC

(57) ABSTRACT

A method for controlling or regulating the temperature of a steel strip in hot forming in a hot strip mill. A superordinate open-loop or closed-loop controller has a process model that predetermines the temperature development of the hot strip. The target values of the individual units are adjusted based on this predetermined temperature development.

20 Claims, 2 Drawing Sheets

(58) Field of Classification Search
CPC .................. G05B 13/02; G05B 13/04; G05B 2219/45234; G05B 13/048; G05B 17/02; G05B 2219/32015
See application file for complete search history.

(56) References Cited

FOREIGN PATENT DOCUMENTS

| | | |
|---|---|---|
| EP | 2431104 A1 | 3/2012 |
| KR | 1020100009649 A | 1/2010 |
| WO | 2013110754 A2 | 8/2013 |

OTHER PUBLICATIONS

International Search Report and Written Opinion issued on Aug. 11, 2021, in corresponding International application No. PCT/EP2021/057720; 18 pages (with English Translation).
International Preliminary Report on Patentability issued on Jul. 15, 2022, in corresponding International application No. PCT/EP2021/057720; 32 pages (with English Translation).
Written Opinion of International Preliminary Examination Authority issued on Apr. 11, 2022, in corresponding International application No. PCT/EP2021/057720; 12 pages (with English Translation).
Michael Breuer et al., "Predictive Process Control—the next step to quality assurance", SMS Artikel, AISTech, 2019, 7 pgs.
A. Sprock et al, "Integrated Temperature Model (ITM)", SMS Artikel, Estad2019, 7 pgs.

\* cited by examiner

METHOD FOR THE OPEN-LOOP OR CLOSED-LOOP CONTROL OF THE TEMPERATURE OF A STEEL STRIP DURING HOT WORKING IN A HOT STRIP MILL

FIELD

The invention relates to a method for controlling or regulating the temperature of a steel strip in hot forming in a hot strip mill.

BACKGROUND

Hot forming of a steel strip usually takes place in a hot strip mill. Said hot strip mill consists of different individual units such as, for example, furnaces, roll stands, drives, unwinding and winding systems for the steel strip, or cooling sections. A large number of different devices or methods are known for open-loop or closed-loop control of such units. These open-loop or closed-loop controls are essentially based on a target/actual value comparison and deriving appropriate corrective measures to maintain the target value. Here, the target values to be observed are defined on the basis of empirical knowledge and/or previous process analyses. Furthermore, a relationship between the product properties of the steel strip and the target values of the unit to be set is usually established in advance. In production of the steel strip, there is usually a complex relationship between a wide variety of target values and the desired product properties.

Due to the increasing digitization of plant technology, unit-related process models are used for the development of suitable target values that lead to the desired product properties. Depending on the data available, complexity of the relationships and/or effort, statistical models, analytical models or neural networks are used for these unit-related process models, for example.

The disadvantage of such closed-loop control concepts for hot strip mills having multiple units is that interactions when changing target value specifications or actual values across the various units are not mapped by the unit-related process models and/or open-loop or closed-loop controls of the units. Especially in the production of steel strips with high demands on the material quality, the complex interaction of time, temperature, structure development and by these quasi-static closed-loop controls of individual aggregates can be difficult to optimize.

Furthermore, open-loop or closed-loop controls of individual units of a hot strip mill are disadvantageous in that an optimization of the process control of the individual unit does not always necessarily lead to the optimization of the entire production process. In particular in combined systems with, for example, continuous casting systems, energy and production costs can be saved through more dynamic process controls.

SUMMARY

It is the object of the invention to further develop known open-loop or closed-loop controls of a hot strip mill such that the target value specifications for the individual units are optimized across the plant with regard to the product properties of a steel strip, for example.

The object of the invention is achieved with a method. On a data processing system assigned to the hot strip mill, a superordinate process model exchanges and/or stores online target and/or actual values, including times, speeds, temperature, cooling rates and/or heating rates, with at least two open-loop or closed loop controls of the units. The superordinate process model, based on the exchanged target and/or actual values and/or stored values and using subordinate process models, such as, for example, a temperature model of the furnace, a temperature model of the cooling section or a model of the forming in the hot strip mill, predetermines the temperature of the steel strip online for at least one point before the hot strip is coiled. The superordinate process model determines new target value specifications for the units at this point in case of deviations in the predetermined temperature from a target value specification, transfers the target value specifications to the open-loop controller or closed-loop controller of the unit in order to comply with the target value specification for the temperature of the steel strip. The determination of the new target value specifications is carried out by using an optimization algorithm including at least one subordinate process model.

The superordinate process model maps a current production status of the steel strip based on the target and/or actual values of the units. Through suitable process models, such as, for example, energy and material balances for a homogenization furnace or a statistical model for that microstructural development of a steel strip, the superordinate process model determines the future development of a temperature profile before, for example, coiling. As a result, a difference between the target value specification for this individual unit and a possible deviation can be identified at an early stage. An optimization algorithm running in the superordinate optimization model can optimize target value specifications such that the target value specification for the hot strip before coiling is achieved, taking into account previously specified optimization goals. The optimization goals defined in advance can be, for example, production goals, in particular amounts of energy, production quantities or quality goals.

Preferred embodiments of the method are presented in the features of the disclosure. According to the disclosure, it is preferred that the preliminary product is a slab with a thickness $d_B \geq 1$ mm to $d_B \leq 300$ mm, preferably $d_B \geq 50$ mm to $d_B \leq 160$ mm from a casting machine and that the superordinate process model takes into account a casting speed, preferably between $v_G \geq 4$ m/min and $v_G \leq 6$ m/min, more preferably $v_G \geq 5$ m/min and $v_G \leq 6$ m/min, and a casting machine outlet temperature, preferably $T_{GE} \geq 800°$ C. of the slab when determining the target specifications.

Preferably, according to the disclosure, the optimization target comprises energy consumption, production volume, process reliability, product properties, production costs and/or plant wear, the preferred reference variables in the field of steel production.

Furthermore, according to the disclosure, it is preferred if a subordinate process model determines the structure development of the steel strip in the hot strip mill for at least one point, preferably before the hot strip is coiled. In addition to the optimized temperature control, the resulting structure development is crucial for the further material properties and/or processing of the steel strip. The more precise open-loop or closed-loop control of the structure development in the course of the process makes it possible to react to deviations at an early stage and to reduce the quantities of rejects and/or post-treatments.

According to the disclosure, a roughing stand and a finishing stand are ideally used in hot forming. By dividing hot forming into a roughing stand and a finishing stand, advantageous temperature distributions and sequences can be set and these can also be better mapped by a larger number of measuring and control points. This enables the superordinate process model to react better to deviations. Furthermore, there are more opportunities to intervene in target value specifications of hot rolling.

It is preferred, according to the disclosure, that a temperature target value of $T_{FS} \geq 850°$ C. to $T_{FS} \leq 1050°$ C., preferably $T_{FS} \geq 900°$ C. to $T_{FS} \leq 1000°$ C., even more preferably $T_{FS} \geq 900°$ C. to $T_{FS} \leq 950°$ C. is specified by the superordinate process model for the target value of the inlet temperature into the finishing stand. Furthermore, it is preferred if a temperature target value within $T_{FE} \geq 750°$ C. to $T_{FE} \leq 950°$ C., preferably $T_{FE} \geq 750°$ C. to $T_{FE} \leq 900°$ C., more preferably $T_{FE} \geq 800°$ C. to $T_{FE} \leq 850°$ C. is specified by the superordinate process model for the target value of the outlet temperature out of the finishing stand.

According to the disclosure, a speed target value of $v_F \geq 0.4$ m/s to $v_F \leq 1$ m/s is specified by the superordinate process model for the target value of the inlet speed into the finishing stand.

According to the disclosure, a temperature target value of $T_{VS} \geq 1000°$ C. to $T_{VS} \leq 1150°$ C. is specified by the superordinate process model for the target value of the inlet temperature into the roughing stand. The target value of the outlet temperature from the roughing stand is specified by the superordinate process model for in a temperature range of $T_{VE} \geq 950°$ C. to $T_{VE} \leq 1100°$ C.

Ideally, according to the disclosure, a target value of $d_{FS} \geq 20$ mm to $d_{FS} \leq 70$ mm is specified by the superordinate process model for the target value of the inlet thickness into the finishing stand. The target value of the coiling temperature is preferably specified by the process model in the range from $T_H \geq 30°$ C. to $T_{VE} \leq 750°$ C., more preferably $T_H \geq 450°$ C. to $T_H \leq 550°$ C.

According to the disclosure, it is preferred if the alloying element C is limited to a content of 0.03% by weight to 0.15% by weight and/or Mn is limited to a content of 0.50% by weight to 2.00% by weight in the steel strip.

According to the disclosure, it is preferred if the optimized target value specifications are used for the production of a subsequent hot strip with the same production goals, in particular mechanical property. As a result, already existing optimized process sequences, which are described by the corresponding target value specifications, can be related to further production of the same material or steel strip type. This saves optimization time and makes it possible to react to gradual plant changes in advance.

Preferably, according to the disclosure, on a data processing system assigned to the hot strip mill, a superordinate process model can exchange and/or store online target and/or actual values, including times, speeds, temperature, cooling rates and/or heating rates, with at least two open-loop or closed-loop controllers of the units. The superordinate process model, based on the exchanged target and/or actual values and/or stored values and using subordinate process models, predetermines the temperature of the steel strip online for at least one point before the hot strip is coiled, and determines new target value specifications of the respective units at this point in case of deviations in the predetermined temperature from a target value specification. The new target value specifications are transferred to the open-loop or closed-loop controller of the respective unit in order to comply with the target value specification for the temperature of the steel strip. The determination of the new target value specifications is carried out by using an optimization algorithm including at least one subordinate process model.

The method according to the invention is described in detail below with reference to the figures mentioned in the form of exemplary embodiments. In all figures, the same technical elements are denoted by the same reference numerals.

BRIEF DESCRIPTION OF THE FIGURES

The following three figures are attached to the description.

DETAILED DESCRIPTION

Figure 1:
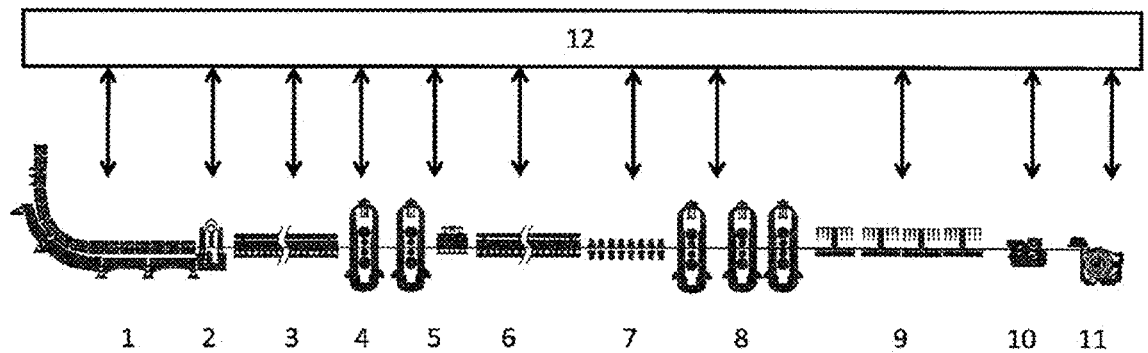
FIG. 1: Plant diagram of the hot strip mill

FIG. 1 shows a possible plant diagram of a hot strip mill for the production of a hot strip in which the method according to the invention is used. The hot strip mill consists of a casting plant 1, two shears 2, 10, two furnaces 3, 6, two roughing stands 4, a transfer bar cooling 5, an inductive heating 7, three finishing stands 8, a cooling section 9 and a coiler 11 for winding up the hot strip. A superordinate data processing system 12 has an integrated temperature and structure model. Target and actual values are exchanged with the different plants or associated closed-loop controls, open-loop controls and/or measuring systems and stored, for example, in the form of a database.

Figure 2:
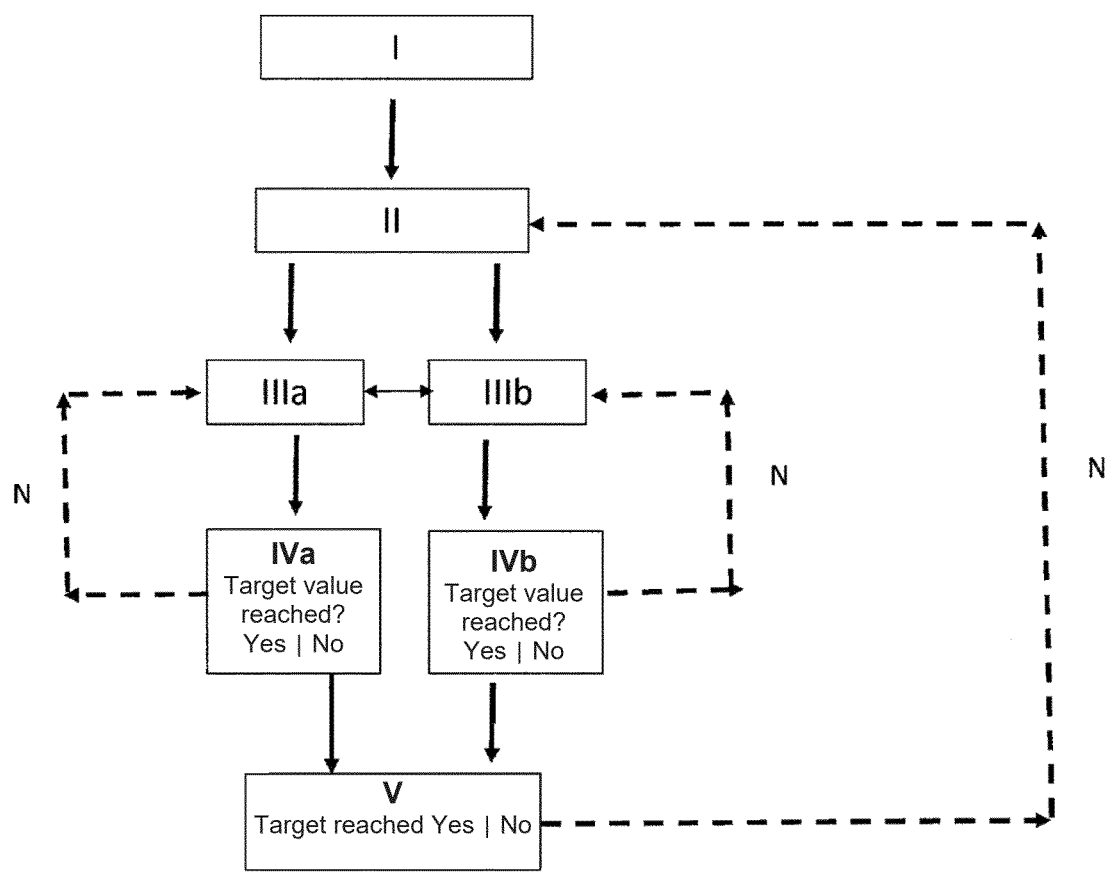
FIG. 2: Closed-loop control scheme with superordinate process model

FIG. 2 shows a flowchart with an exemplary networking of two units or closed-loop controls of the two units with the respective process models. The superordinate data processing system I transfers target values to the superordinate process model II of the hot strip mill. From these target values, for example a strength, the superordinate process model II determines a number of target values or target value ranges, for example a temperature profile with minimum and maximum temperatures, which are transferred to the subordinate process models IIIa, b. The subordinate process models III a, b use these values to derive specific target values for the respective unit. For example, a specified temperature profile with assigned points in time becomes a target specification for burner control in a furnace 3 or a target specification for controlling the amount of water in a cooling section 9. These are passed on to the corresponding closed-loop controls of the respective units.

If the values within the unit are not reached, the subordinate process model III a, b can adjust the target specification. Likewise, an automatic optimization of the process model IIIa, b can also take place here by means of a self-learning algorithm. If the actual target value deviates from the target value specification V of the superordinate process model II, the target values are recalculated on the superordinate level II and adjusted if necessary.

Figure 3:
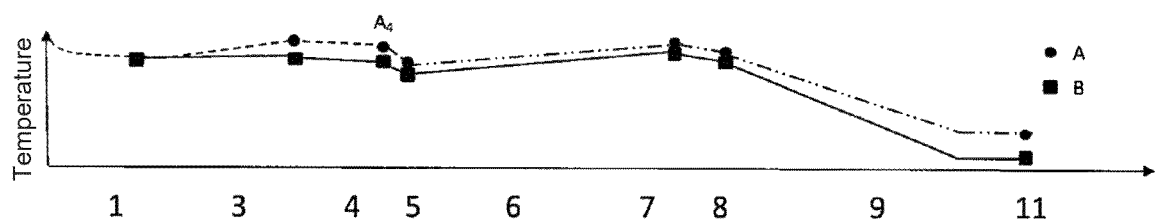
FIG. 3: Comparison of temperature profile target value, actual value

FIG. 3 shows a diagram with a target temperature profile B and a measured and precalculated temperature profile A. The target temperature profile B begins at the end of the casting plant 1 and describes the course up to coiler 11. The actual values are plotted from the end of the casting plant 1 to the roughing stand 4. Here, the measured temperature is above the target temperature. From this point onwards, the superordinate process model II precalculates the temperatures at the various points in the hot strip mill. Based on this temperature profile, different target values can be newly specified at different points in order to correct the temperature deviation. Different process models, material or structure models and/or optimization algorithms can be used to determine the best adjustment strategy.

TABLE 1

| Reference numerals | |
|---|---|
| 1 | casting plant |
| 2 | shear |
| 3 | oven |
| 4 | roughing stands |
| 5 | transfer bar cooling |
| 6 | oven |
| 7 | inductive heating |
| 8 | finishing stands |
| 9 | cooling section |
| 10 | shear |
| 11 | coiler |
| 12 | integrated temperature and structure model |
| I | data processing system |
| II | superordinate process model |
| III a, b | subordinate process model |
| IV a, b | control of the unit |
| V | target value specification |
| A | actual value profile or pre-calculated course |
| $A_4$ | actual temperature of roughing stand |
| B | target value profile |

The invention claimed is:

1. A method for open-loop or closed-loop controlling a temperature of a steel strip with alloying elements

| | in % by weight | |
|---|---|---|
| | min | max |
| C | 0 | 1 |
| Mn | 0 | 2.5 | in hot forming of a preliminary product with a thickness between $d_V \geq 1$ mm and $d_V \leq 300$ mm into a hot strip with a hot strip thickness $d_{WB} \leq 25$ mm and a hot strip width between $b_{WB} \geq 900$ mm and $b_{WB} \leq 2100$ mm, a target coiling temperature $T_H \geq 30°$ C. to $T_H \leq 750°$ C. in a hot strip mill, having at least one furnace for heating and temperature homogenization of the preliminary product, at least one roll stand for hot rolling the preliminary product, a cooling section for targeted cooling of the hot strip after forming, and a coiler for winding the hot strip to form a coil, with each individual unit having its own open-loop or closed-loop controller for the specified target values, wherein on a data processing system assigned to the hot strip mill, a superordinate process model exchanges and stores online target and actual values, including times, speeds, temperature, cooling rates and heating rates, with at least two open-loop or closed-loop controllers of the units;

the superordinate process model, based on the exchanged target and actual values and stored values and using subordinate process models, predetermines the temperature of the steel strip online for at least one point before the hot strip is coiled; and the superordinate process model determines new target value specifications of the units at this point in case of deviations of the predetermined temperature from a target value specification, and transfers them to the open-loop or closed-loop controller of the unit in order to comply with the target value specification for the temperature of the steel strip;

the determination of the new target value specifications is carried out by using an optimization algorithm including at least one subordinate process model; and controlling the temperature of the strip with the alloying elements using the new target value specification in response to the predetermined temperature deviations.

2. The method according to claim 1,
wherein
the preliminary product is a slab with a thickness $d_B \geq 50$ mm to $d_B \leq 160$ mm from a casting machine; and
the superordinate process model takes into account a casting speed, preferably between $v_G \geq 4$ m/min and $v_G \leq 6$ m/min, more preferably $v_G \geq 5$ m/min and $v_G \leq 6$ m/min, and a casting machine outlet temperature, preferably $T_{GE} \geq 800°$ C., of the slab when determining the target specifications.

3. The method according to claim 1,
wherein
the optimization goal comprises energy consumption, production volume, process reliability, product properties, production costs and plant wear.

4. The method according to claim 1,
wherein
a subordinate process model determines the structure development of the steel strip in the hot strip mill for at least one point, preferably before the hot strip is coiled.

5. The method according to claim 1,
wherein
a roughing stand and a finishing stand are used in hot forming.

6. The method according to claim 4,
wherein
a temperature target value of $T_{FS}=850°$ C. to $T_{FS}=1050°$ C., preferably $T_{FS}=900°$ C. to $T_{FS}=1000°$ C., even more preferably $T_{FS}=900°$ C. to $T_{FS}=950°$ C. is specified by the superordinate process model for the target value of the inlet temperature into the finishing stand.

7. The method according to claim 4,
wherein
a temperature target value within $T_{FE} \geq 750°$ C. to $T_{FE} \leq 950°$ C., preferably $T_{FE} \geq 750°$ C. to $T_{FE} \leq 900°$ C., more preferably $T_{FE} \geq 800°$ C. to $T_{FE} \leq 850°$ C. is specified by the superordinate process model for the target value of the outlet temperature out of the finishing stand.

8. The method according to claim 4,
wherein
a speed target value of $v_F \geq 0.4$ m/s to $v_F \leq 1$ m/s is specified by the superordinate process model for the target value of the inlet speed into the finishing stand.

9. The method according to claim 4,
wherein
a temperature target value of $T_{VS} \geq 1000°$ C. to $T_{VS} \leq 1150°$ C. is specified by the superordinate process model for the target value of the inlet temperature into the roughing stand.

10. The method according to claim 4,
wherein
a temperature target value of $T_{VE} \geq 950°$ C. to $T_{VE} \leq 1100°$ C. is specified by the superordinate process model for the target value of the outlet temperature from the roughing stand.

11. The method according to claim 4,
wherein a target value within $d_{FS} \geq 20$ mm to $d_{FS} \leq 70$ mm is specified by the superordinate process model for the target value of the entry thickness into the finishing stand.

12. The method according to claim 1, wherein
a temperature target value of $T_H \geq 30°$ C. to $T_{VE} \leq 750°$ C., preferably $T_H \geq 450°$ C. to $T_{TH} \leq 550°$ C. is specified by the superordinate process model for the target value of the coiling temperature.

13. The method according to claim 1, wherein
the alloying element C is limited to a content of 0.03% by weight to 0.15% by weight and Mn to a content of 0.50% by weight to 2.00% by weight in the steel strip.

14. The method according to claim 1, wherein
the optimized target value specifications are used for the production of a subsequent hot strip with the same production goals, including the mechanical properties.

15. A device for open-loop or closed-loop controlling the temperature of a steel strip according to a method according to claim 1, wherein
on a data processing system assigned to the hot strip mill, target and actual values, including times, speeds, temperature, cooling rates and heating rates, can be exchanged and stored online with at least two open-loop or closed-loop controllers of the units by a superordinate process model;
the superordinate process model, based on the exchanged target and actual values and stored values and using subordinate process models, can predetermine the temperature of the steel strip online for at least one point before the hot strip is coiled; and
the superordinate process model determines new target value specifications of the respective units at this point in case of deviations of the predetermined temperature from a target value specification, and transfers them to the open-loop or closed-loop controller of the respective unit in order to comply with the target value specification for the temperature of the steel strip; and
the determination of the new target value specifications is carried out by using an optimization algorithm including at least one subordinate process model.

16. The method according to claim 2, wherein
the optimization goal comprises energy consumption, production volume, process reliability, product properties, production costs and plant wear.

17. The method according to claim 2, wherein
a subordinate process model determines the structure development of the steel strip in the hot strip mill for at least one point, preferably before the hot strip is coiled.

18. The method according to claim 3, wherein
a subordinate process model determines the structure development of the steel strip in the hot strip mill for at least one point, preferably before the hot strip is coiled.

19. The method according to claim 2, wherein
a roughing stand and a finishing stand are used in hot forming.

20. The method according to claim 3, wherein
a roughing stand and a finishing stand are used in hot forming.

* * * * *